T. MUNGALL.
HEAT AND COLD INDICATOR.
APPLICATION FILED MAY 15, 1917.
1,334,960.
Patented Mar. 30, 1920.
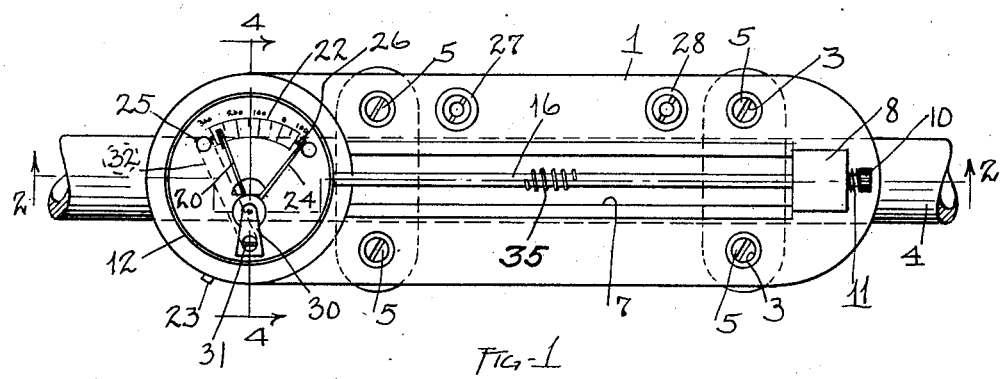
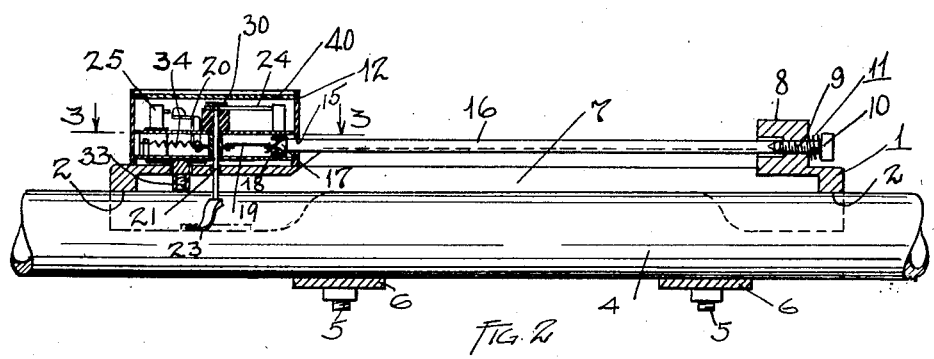
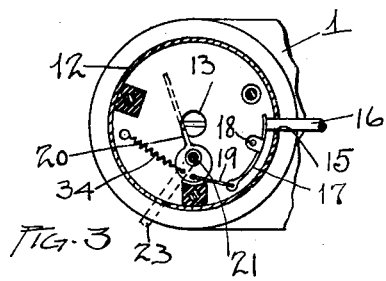
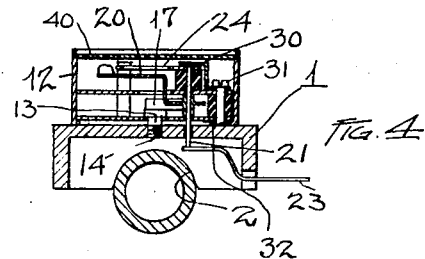
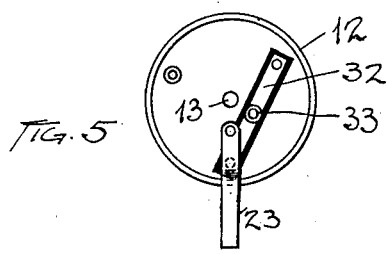
INVENTOR
Thomas Mungall.
BY Jay, Oberlin & Jay
ATTORNEYS.

UNITED STATES PATENT OFFICE.

THOMAS MUNGALL, OF CLEVELAND, OHIO, ASSIGNOR TO SIMPLEX MANUFACTURING COMPANY, OF CLEVELAND, OHIO, A PARTNERSHIP COMPOSED OF THOMAS MUNGALL AND H. D. GEMELFINGER.

HEAT AND COLD INDICATOR.

1,334,960.      Specification of Letters Patent.      Patented Mar. 30, 1920.

Application filed May 15, 1917. Serial No. 168,662.

*To all whom it may concern:*

Be it known that I, THOMAS MUNGALL, a citizen of the United States, and a resident of Cleveland, county of Cuyahoga, and State of Ohio, have invented a new and useful Improvement in Heat and Cold Indicators, of which the following is a specification, the principle of the invention being herein explained and the best mode in which I have contemplated applying that principle, so as to distinguish it from other inventions.

The present invention relates to a device for indicating temperatures and more particularly refers to a device for use on pipes to operate a warning signal when the pipe temperature reaches either a predetermined maximum or minimum temperature. Means have been provided for adjusting the device so that both the maximum and minimum temperatures may be changed in order that the temperature range may be varied as desired. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawings:—

Figure 1 is a plan view of my indicator; Fig. 2 is a section on line 2—2, Fig. 1; Fig. 3 is a section on line 3—3, Fig. 2; Fig. 4 is a section on the line 4—4, Fig. 1; and Fig. 5 is a bottom plan of the indicator casing.

The device consists essentially of a base member 1, having a channel 2 on the under side adapted to fit over a pipe 4 or the like. This base member is provided with apertures 3 through which bolts 5 will be passed, and these bolts have threaded engagement with cross pieces 6 placed below the pipe, to hold the device in place. This base member is provided with an elongated slot 7 extending lengthwise of the member and has at one end a raised boss 8 located centrally at the end of the slot. This boss 8 has a threaded aperture 9, in which is mounted an adjusting screw 10. A coiled spring 11 is mounted on the adjusting screw between the head and the end of the boss, and this spring is adapted to hold the screw to prevent accidental movement of the screw.

At the other end of the base there is mounted a small indicator casing 12, which is held to the base by means of a centrally located screw 13, which has threaded connection with an aperture 14 in the base member. This indicator casing is provided with a small aperture 15 which is adapted to be alined with the slot in the base. An expanding rod 16 is mounted in the raised portion of the base member and through the aperture in the indicating casing, and is alined with the slot in the base member. This rod is adapted to expand and contract readily with changes in temperature and is held over and in close proximity to the pipe 4. At one end this expansible rod will contact the adjusting screw mounted in the boss on the base member, and at its other end is adapted to be in contact with a small lever arm 17 pivotally mounted on a pin 18 held in the indicator casing.

This lever arm is connected by means of a wire 19 or the like to the pointer 20, which is loosely mounted on the bearing stud 21 carried by the indicator casing. This pointer is adapted to move over a graduated dial 22 mounted below a glass cover 40 and thus indicates the degree of heat of the expansible rod and therefore of the pipe itself. The bearing stud on which this pointer is mounted extends through the base member and at the bottom is connected to a handle 23 and at the top to a movable contact arm 24, which also moves over the graduated dial. On the dial is mounted a contact pin 25 which will be contacted by the pointer at the maximum limit of travel and the contact arm has a contact lug 26 which will be contacted by the pointer at its minimum point of travel. A spring 34 is connected to the pointer 20 and the casing to return the pointer toward the contact arm 24.

On the base member are mounted two contact screws 27 and 28 which will be connected with the bell or light adapted to act as the indicator, and one of these screws 28 is grounded to the base member and the other is directly connected to the contact pin and to the contact arm, so that when either is engaged by the pointer, which is grounded on the base member, the circuit will be closed and the indicator, whether a light or a bell, will be operated to warn the user that the temperature has reached either the maximum or minimum limit. Current will be supplied to this circuit from any convenient source, such as a battery or from an electric lighting circuit.

The contact arm will of course be insulated from the bearing stud on which it is mounted and will be electrically connected to the contact pin by means of a small strip 30 which is electrically connected to a screw 31 mounted through the indicator base, and connected at its lower end to a strip 32 which in turn is connected to the contact pin. This strip 32 has a stud 33 extending through the base member and insulated therefrom and is connected by a wire or the like to one of the contact screws 27.

In operating the device the base member will be clamped to the pipe and then the maximum and minimum temperatures will be determined. Taking the zero point on the dial as the mean temperature desired, those figures to the left of the dial indicate the number of degrees of temperature above that mean, so that the pointer hand will have to move over a range of 300 degrees before it will make a contact with the pin to operate the alarm. If, however, it is desired to have the alarm operated at a rise in temperature of only 100 degrees above the mean, then the adjusting screw would be moved inwardly to contact the expanding bar and move the same toward the indicator casing until the pointer is set to read 200 degrees. It will be seen that only a rise of 100 degrees is then needed to expand the bar sufficiently to operate the indicator. The contact arm or hand will be set by means of the small handle on the bottom of the casing, to any desired point below the mean used, so that any desired drop in temperature may be obtained before the indicator will operate. It will thus be clear that the device may be adjusted to operate under almost any condition because the expansible bar is not fixed at either end, but may be adjusted to start with any temperature as the mean or determining temperature and that from the temperature any given rise and fall may be set to operate the alarm signal.

On the expansible bar is shown a coiled spring 35, which grips the bar tight enough so that pressure by the operator will move the bar toward the indicator and thus move the pointer up against the contact pin. In this way it is possible to determine whether the circuit is in working order at any time.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a heat and cold indicator, the combination of a slotted base member, an expansible rod mounted on said base member over such slot, indicating means consisting of a graduated dial, a contact pin at the maximum range, and a movable pointer, means connecting said pointer and said rod whereby expansion of said rod will move said pointer, means for adjusting the mean temperature position of said rod and said pointer, and a movable contact arm adapted to limit the minimum range of movement of said pointer.

2. In a heat and cold indicator, the combination of a slotted base member, an expansible rod mounted on said base member over such slot, indicating means consisting of a graduated dial, a contact pin, a contact arm, and a movable pointer adapted to make electrical contact with said pin and said arm at predetermined maximum and minimum temperatures respectively, said pointer being connected to said rod and operable by the expansion thereof, means for positioning said rod in said base and thus varying the mean temperature position of said pointer, and other means for adjusting position of contact arm.

3. In a heat and cold indicator, the combination of a slotted base member having a boss at one end adjacent such slot, an expansible rod adjustably mounted in said boss, indicating means consisting of a casing, a graduated dial, a contact pin, an adjustable contact arm, and a movable pointer adapted to close an electrical circuit at its maximum and minimum temperature positions through said pin and said arm respectively, said pointer being connected to said expansible rod and operated thereby, means for adjusting said rod and said pointer to vary the mean temperature position of the latter, and means for adjusting the position of said contact arm to vary the temperature range through which said pointer will operate.

Signed by me, this 12th day of May, 1917.

THOMAS MUNGALL.